US007953703B2

(12) United States Patent
Aggarwal et al.

(10) Patent No.: US 7,953,703 B2
(45) Date of Patent: May 31, 2011

(54) CREATION OF HIGHLY AVAILABLE PSEUDO-CLONE STANDBY SERVERS FOR RAPID FAILOVER PROVISIONING

(75) Inventors: Vijay Kumar Aggarwal, Austin, TX (US); Craig Lawton, Raleigh, NC (US); Christopher Andrew Peters, Round Rock, TX (US); P. G. Ramachandran, Austin, TX (US); Lorin Evan Ullmann, Austin, TX (US); John Patrick Whitfield, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/060,606

(22) Filed: Feb. 17, 2005

(65) Prior Publication Data

US 2006/0190775 A1 Aug. 24, 2006

(51) Int. Cl.
*G06F 11/00* (2006.01)
(52) U.S. Cl. ......... 707/654; 709/203; 709/223; 714/100
(58) Field of Classification Search .................. 714/100, 714/101, 102; 707/100–106, 200–204, 999
See application file for complete search history.

(56) References Cited

U.S. PATENT DOCUMENTS

| | | | | |
|---|---|---|---|---|
| 4,853,843 | A * | 8/1989 | Ecklund .................. | 707/203 |
| 5,535,375 | A | 7/1996 | Eshel et al. | |
| 5,826,239 | A | 10/1998 | Du et al. | |
| 6,064,950 | A | 5/2000 | Lehtinen | |
| 6,178,522 | B1 | 1/2001 | Zhou et al. | |
| 6,292,905 | B1 | 9/2001 | Wallach et al. .................. | 714/4 |
| 6,542,854 | B2 * | 4/2003 | Yang et al. .................. | 702/186 |
| 6,665,689 | B2 | 12/2003 | Muhlestein .................. | 707/204 |
| 6,701,453 | B2 | 3/2004 | Chrabaszcz .................. | 714/13 |
| 6,996,743 | B2 | 2/2006 | Knapp, III | |
| 7,035,922 | B2 * | 4/2006 | Parham .................. | 709/224 |
| 7,167,862 | B2 | 1/2007 | Mullins | |

(Continued)

FOREIGN PATENT DOCUMENTS

WO          WO 99/66401 A1          12/1999

OTHER PUBLICATIONS

USPTO; examination correspondence in U.S. Appl. No. 12/013,705, now issued as US Patent 7,499,865; retrieved on Jan. 26, 2010.

(Continued)

*Primary Examiner* — Etienne P LeRoux
*Assistant Examiner* — Mohammad N Rahman
(74) *Attorney, Agent, or Firm* — Robert H. Frantz; Jeffrey S. LaBaw

(57) ABSTRACT

Near clones for a set of targeted computing systems are provided by evaluating different configurations of the targeted computing systems including lists of installed hardware components and installed software components; determining a subset of components in common among the different configurations; determining an initial pseudo-clone configuration including the subset of components and excluding components which are not in common among the different target hardware configurations; for each of the targeted computing systems, producing a finish-out workflow of installation steps and components to be installed into an incompletely configured computer system according to the pseudo-clone configuration to produce an operational clone system; and outputting the pseudo-clone configuration and the workflow to a provisioning management system for subsequent realization of a pseudo-clone backup computing system and further subsequent realization of one or more operational clone systems.

15 Claims, 5 Drawing Sheets

U.S. PATENT DOCUMENTS

| | | |
|---|---|---|
| 7,293,080 B1 | 11/2007 | Clemm et al. |
| 7,370,233 B1 | 5/2008 | Sobel et al. |
| 7,409,519 B2 | 8/2008 | Coronado et al. |
| 2002/0194251 A1* | 12/2002 | Richter et al. ............. 709/105 |
| 2003/0084159 A1* | 5/2003 | Blewett ..................... 709/226 |
| 2003/0172141 A1* | 9/2003 | Miller et al. .............. 709/223 |
| 2003/0233378 A1 | 12/2003 | Butler et al. |
| 2004/0010429 A1 | 1/2004 | Vedula et al. |
| 2004/0182086 A1 | 9/2004 | Chiang et al. |
| 2004/0193969 A1* | 9/2004 | Nemoto et al. ............ 714/100 |
| 2004/0215673 A1* | 10/2004 | Furukawa et al. .......... 707/204 |
| 2005/0010838 A1* | 1/2005 | Davies et al. .............. 714/100 |
| 2005/0131982 A1 | 6/2005 | Yamasaki et al. |
| 2005/0174934 A1 | 8/2005 | Kodialam et al. |
| 2005/0273675 A1* | 12/2005 | Rao et al. .................. 714/100 |
| 2006/0015781 A1* | 1/2006 | Rothman et al. ........... 714/100 |

OTHER PUBLICATIONS

USPTO; examination correspondence from related U.S. Appl. No. 11/016,210, retrieved on Jan. 26, 2010.

* cited by examiner

CREATION OF HIGHLY AVAILABLE PSEUDO-CLONE STANDBY SERVERS FOR RAPID FAILOVER PROVISIONING

CROSS-REFERENCE TO RELATED APPLICATIONS (CLAIMING BENEFIT UNDER 35 U.S.C. 120)

None.

CROSS-REFERENCE TO RELATED APPLICATIONS

None.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

None.

BACKGROUND OF THE INVENTION

1. Field of the Invention

This invention relates to creation of standby servers and near clones for rapid failover provisioning in a networked computing environment.

2. Background of the Invention

As business demand increases, the depth of technology improvements and its intelligence to handle multiple processes becomes highly desirable and crucial. In any enterprise operation, it is difficult to effectively manage the ever-fluctuating resources available, while maximizing the resource utilization.

In fact, Information Technology ("IT") costs can become very expensive when maintaining sufficient resources to meet peak requirements. Furthermore, user inputs are generally required to facilitate such processes, which incurs additional costs in both time and human resource demand.

To address these needs, many large vendors of enterprise computing systems, such as International Business Machines ("IBM"), Hewlett-Packard ("HP"), Microsoft Corporation, and Sun Microsystems ("Sun"), have begun to develop and deploy infrastructure technologies which are self-managing and self-healing. HP's self-managed computing architecture is referred to "Utility Computing" or "Utility Data Center", while Sun has dubbed their initiative "N1". IBM has applied terms such as "Autonomic Computing", "Grid Computing", and "On-Demand Computing" to their various architecture and research projects in this area. While each vendor has announced differences in their approaches and architectures, each shares the goal of providing large-scale computing systems which self-manage and self-heal to one degree or another.

For example, IBM's Autonomic Computing is a self-managing computing model which is patterned on the human body's autonomic nervous system, controlling a computing environment's application programs and platforms without user input, similar to the way a human's autonomic nervous system regulates certain body functions without conscious decisions.

Additionally, IBM has defined their On-Demand Computing technology as an enterprise whose business processes, integrated end-to-end across the company and with key partners, suppliers, and customers, can respond quickly to any customer demand, market opportunity, or external threat.

"Provisioning" is a term used to describe various aspects of managing computing environments, and which often implies different things to different parties. Throughout the present disclosure, we will use the term "provision" or "provisioning" to refer to a sequence of activities that need to happen in a specific order in order to realize a computing environment to meet specific needs and requirements. The activities have dependencies on previous activities, and typically include:
  (a) selecting appropriately capable hardware for the requirements, including processor speed, memory, disk storage, etc.;
  (b) installing operating system(s);
  (c) remotely booting networks;
  (d) configuring networks such as Virtual Private Networks ("VPN") and storage environments like Storage Area Network ("SAN") or Network Attached Storage ("NAS"); and
  (e) deprovisioning resources that are no longer needed back into an available pool.

Operating environments in large data centers have become increasingly complex. These data centers usually require a long time to modify their environments, so most provision for the worst-case scenario, often configuring more hardware than is needed just in case a peak requirement is experienced. As a result, most hardware and software resources are under-used, increasing the costs of the system considerably. Furthermore, the issue of surges beyond what has been provisioned remains unaddressed (e.g. peak demands above the anticipated peak load).

In fact, provisioning is typically a time and labor consuming process consisting of hundreds of distinct and complex steps, and requiring highly skilled system and network administrators. For example, server provisioning is the process of taking a server from "bare metal" to the state of running live business transactions. During this provisioning process, many problems may arise such as increases in resource expense and declines in level of performance, which in turn can lead to dissatisfied customers and unavailability in services.

Because these are predictable issues, automation can be employed to manage these problems. One objective of the various self-managed computing systems being offered by the major vendor is to automate to an extent as great as possible these provisioning activities, and especially to allow for near real-time reactions to changes in system requirements and demands, with little or no human administrator intervention. For example, IBM's Tivoli™ Provisioning Manager ("TPM") Rapid Provisioning is a modular and flexible set of workflows and scripts for the IBM Tivoli Intelligent Orchestrator product. The workflows have been generalized and packaged for customization by customers seeking to accelerate their provisioning process. They can be used as a starting point for an organization in automating not only their server provisioning process, but also other IT processes.

Other products currently offered by the major vendors include HP's OpenView OS Manager using Radia which is a policy-based provisioning and ongoing automated management tool for a variety of operating systems, and Sun's N1

Grid Service Provisioning System automates to some degree the provisioning of applications.

"Disaster Recovery" is a broad term used in information technology to refer to the actions required to bring computing resources back online after a failure of the existing system, be it a small failure such as the failure of a single heavily loaded server among many servers, or a large failure such as loss of power or communications to an entire computing center. These types of disasters may be caused by failure rates of the components (e.g. hardware and software failures), as well as by non-computing factors such as natural disasters (e.g. tornados, hurricanes, earthquakes, floods, etc.) and other technical disasters (e.g. power outages, virus attacks, etc.).

To recover from a disaster, a computing center must re-provision new servers and systems to replace the processing which was being performed by the previous system(s). Often times, the recovery is performed in a different geographic area, but sometimes the recovery is performed in the same physical or geographic location, depending on the nature of the disaster or failure.

Many businesses which employ or rely upon enterprise computing, create disaster recovery plans to be better prepared when the occasion arise. However, current technology only allows for dedicated servers to be implemented. Each server is typically committed to one purpose or application (e.g. a "solution"), whether it is to meet a new customer requirement (e.g. a "production system"), or to be solely used as a backup server for an existing server that may crash in the near future. When these dedicated servers are not in use, the overall IT maintenance costs increase while excess resources remain idle and unused. It is important to note that in order to save critical time during recovery, when a server is configured as a backup of a production server, the backup server's configuration is usually matched to the production server's configuration so that there is no provisioning time required to bring the backup server online and operational.

Disaster recovery implementation remains challenging even though provisioning with orchestration enables new approaches that are not dependent on high availability operating environments such as IBM's z/OS mainframe operating system, clusters, and addresses. When a disaster occurs, the server will either be reinstalled or once it reaches the end of its usefulness, it will be replaced by a newer version with more features and higher reliability.

During recovery and the process of bringing on line a backup server, often network issues arise, such as Internet Protocol ("IP") address conflicts, during a period when a degraded or partially operating production server and a newly started backup server operate at the same time.

Further, moving either static configuration data or dynamic state data from a failed or degraded production server to the backup server remains a complicated and difficult procedure, as well.

As a result, once a production server has been deployed in a production environment, it usually is used until a disaster happens, which repeats the provisioning process again while its old implementation problems remains unresolved.

Turning to FIG. 3, a logical view of how one available provisioning manager manages an application cluster (30). The management server (36) gathers the information on resources and then the management services (37, 37', 37''') monitor any processes currently being performed or executed. The network pool (31) includes components such as routers, switches, fabrics and load balancers for the network environment. The application pool (32) typically includes a first tier of the applications operating on the servers, such as a databases (e.g. IBM DB2, Oracle, etc.), running on top of server platform for suite (e.g. IBM WebSphere or equivalent).

The application resource pool (33) is a group of available, unassigned, unprovisioned servers that can be provisioned (38) into the active application pool. The back-end resource pool (34) contains any backup servers necessary for the application pool (32), such as another set of database servers or web server. The backend pool (35) serves as the collection or group of available servers that have been provisioned (38') from the back-end resource pool (34).

As such, during disaster recovery, the aforementioned tedious and laborious provisioning activities may have to be performed to realize many servers and many configures, selected from several pools, in order to restore an enterprise.

Another growing business trend in the industry is "sub-capacity pricing". Subcapacity licensing permits a customer to license a product for use on less than the full capacity as determined by the number of processors of the computing platform. For example, with certain IBM products such as IBM iSeries and AS/400 hardware platforms platforms running OS/400 V4R4, or later, the system is isolated to a logical partition using IBM-provided tools. With subcapacity pricing, the number of processors which need to be licensed is the aggregation of all processors, including partial shares of a processor, across all partitions of a single machine (where the program is defined), rounded up to the next highest whole number. Thus, a customer can obtain considerable costs savings by sub-licensing, if a platform supports it. However, this presents a specific challenge to configuring backup servers and replacement servers, especially in situations where configuration time is of the essence.

Additionally, some pools of servers may be governed by overall licensing restrictions, such as a restriction as to how many copies of a particular program may be running simultaneously across multiple servers in the pool. Taking into account these limitations can also present a considerable challenge to quickly configuring a replacement or backup server.

DETAILED DESCRIPTION OF THE DRAWINGS

The following detailed description when taken in conjunction with the figures presented herein present a complete description of the present invention.

Figure 5:
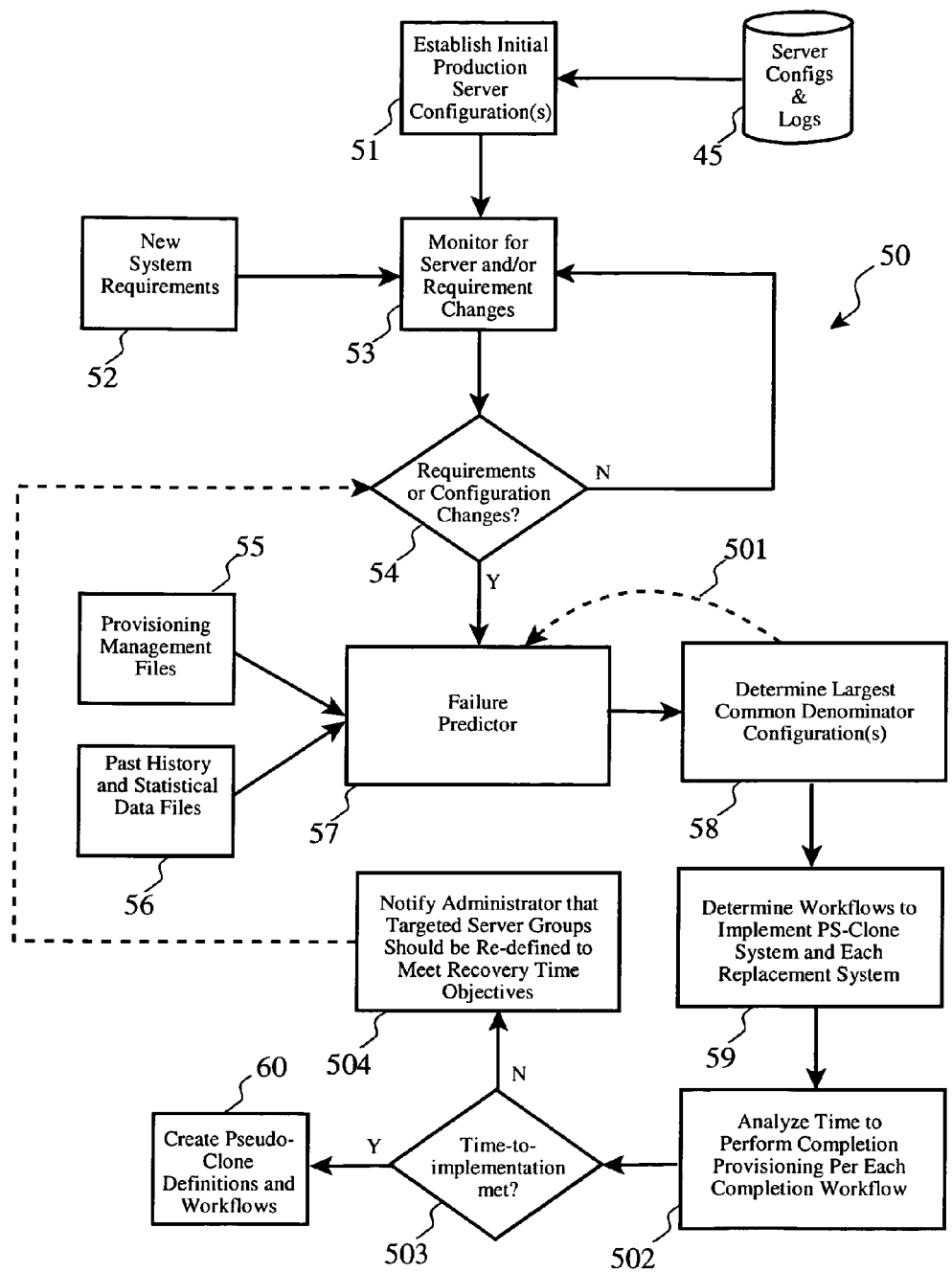

FIG. 5 sets forth a logical process according to the present invention.

SUMMARY OF THE INVENTION

Embodiments of the present invention provide "partial solutions", e.g. servers which are partially provisioned, available to be used to meet any expectations when necessary for activities such as disaster recovery by evaluating different configurations of the targeted computing systems including lists of installed hardware components and installed software components; determining a subset of components in common among the different configurations; determining an initial pseudo-clone configuration including the subset of components and excluding components which are not in common among the different target hardware configurations; for each of the targeted computing systems, producing a finish-out workflow of installation steps and components to be installed into an incompletely configured computer system according to the pseudo-clone configuration to produce an operational clone system; and outputting the pseudo-clone configuration and the workflow to a provisioning management system for subsequent realization of a pseudo-clone backup computing system and further subsequent realization of one or more operational clone systems.

DETAILED DESCRIPTION OF THE INVENTION

One available embodiment of the present invention is to realize the invention as an extension to or addition to the software and hardware components of an existing provisioning management system, such as the systems previously disclosed. The present disclosure utilizes the previously described IBM TPM system for illustration purposes, but it will be readily recognized by those skilled in the art that the present invention may be applied to a wide variety of computing environments.

Determination of Highest Common Denominator Configuration

A first aspect of the method of the present invention determines the greatest amount of common componentry across several configurations of productions servers. For example, three server types in an enterprise, Server 1, Server 2, and Server N, such as the examples shown in FIG. 4 (41, 42, and 43). In this example, all three servers including a computing platform and operating system, and for the sake of this example, we will assume they are all three using the same hardware platform and operating system. However, in practice, hardware platform details (e.g. processor type, amount of RAM, disk space, disk speed, communications bandwidth, etc.) and operating system (e.g. operating system make and model including revision level and service update level) are factors in determining the highest common denominator.

This enterprise (40), then consists of these three server types (41, 42, 43), all of which include the same hardware platform, operating system, and a Lightweight Directory Access Protocol ("LDAP") server program. As such, the highest common denominator for all three servers is this combination of components. According to the present invention, a pseudo-clone which is best suited to serve as a near-backup system for any of these three systems, e.g. a "low priority" pseudo-clone (49'''), is pre-configured (48) to include only these components.

So, using this pseudo-clone pre-configuration (49'''), only the following completion provisioning steps (400) would be necessary in case of a failure of a specific targeted server:
 (a) if Server 1 fails, the pseudo-clone system would be provisioned (400) with:
   1. a WebSphere Application Server license;
   2. a DB2 Universal Database license; and
   3. a Netview license;
 (b) if Server 2 fails, the pseudo-clone system would be provisioned (400) with:
   1. a WebSphere Application Server license;
   2. an Oracle 9i Database license; and
   3. a Netview license; or,
 (c) if Server N fails, the pseudo-clone system would be placed (400) directly into service as it already contains all of the necessary components to replace the functionality of Server N.

In each of these scenarios, completion or final provisioning (400) effort and time is reduced such that the following steps do not have to be performed following the failure event:
 (1) configuring the hardware platform;
 (2) installing an operating system, upgrades, and service packs;
 (3) and installing an LDAP server program.

By "pre-configuring" this pseudo-clone (49''') to already have the highest common denominator componentry of all three servers, it allows "finish out" configuration (400) to a specific server configuration in minimal steps, minimal time, and minimal risk upon a failure event of any of the three servers (41, 42, 43).

However, if the targeted resource pool is reduced to just Servers 1 and 2 (41, 42), then the highest common denominator would be determined to be the hardware platform and operating system, an LDAP server, plus a Netview license and a WebSphere Application Server suite. As such, a "high priority" pseudo-clone (49') for a pool of servers 1 and 2 (41, 42), but not Server N, can be defined and configured (48), which would be even quicker to finally provision (400) to take on the configuration and tasks of either Server 1 or Server 2 in a fail-over or disaster recovery situation.

So, using this higher-level of pseudo-clone (49') pre-configuration targeting just Servers 1 and 2, only the following completion or "finish out" provisioning steps (400) would be necessary in case of a failure of a specific targeted server:
 (a) if Server 1 fails, the pseudo-clone system would be provisioned with a DB2 Universal Database license; or
 (b) if Server 2 fails, the pseudo-clone system would be provisioned with an Oracle 9i Database license.

In each of these scenarios, provisioning effort and time is reduced such that the following steps (48) do not have to be performed following the failure event:
 (1) configuring the hardware platform;
 (2) installing an operating system, upgrades, and service packs;
 (3) installing an LDAP server program;
 (4) installing a WebSphere Application Server; and
 (5) installing a Netview program.

By "pre-configuring" (48) this higher-level pseudo-clone to already have the highest common denominator componentry of all a small variety of servers (e.g. just Servers 1 and 2 but not N), it allows even quicker "finish out" configuration to a specific server configuration in minimal steps, minimal time, and minimal risk upon a failure event of any of the targeted servers (41, 42). However, if Server N fails, reconfiguring the pseudo-clone to perform the functions of Server N may be less than optimal (e.g. certain components have to be de-provisioned or uninstalled.

Of course, other levels of pre-configured servers (49'') are possible, depending on the number of configuration options and configurations deployed in the production environment.

For example, in FIG. 4, if we assign the variables to the server components as follows:
 A=operating system "XYZ", revision level XX
 B=computing platform "LMNOP"
 C=LDAP Server program or license
 D=WebSphere Application Server program or license
 E=Oracle 9i database application program or license
 F=DB2 Universal database application program or license
 G=Netview application program or license then, the configurations of each server expressed in Boolean terms wherein "*" means logical "AND", and "+" means logical "OR":

$$SVR(1) = A*B*C*D*F*G;$$

$$SVR(2) = A*B*C*D*E*G; \text{ and}$$

$$SVR(N) = A*B*C$$

In this representation, the first level pseudo-clone suitable for being a rapid replacement for all three servers 1, 2 and N would have the highest common denominator configuration of:

$$PS\text{-}CLONE(1+2+N) = A*B*C$$

Another pseudo-clone which is a higher level clone of just Servers 1 and 2, but not for Server N, would have the configuration of:

$$PS\text{-}CLONE(1+2) = A*B*C*D*G$$

Figure 4:
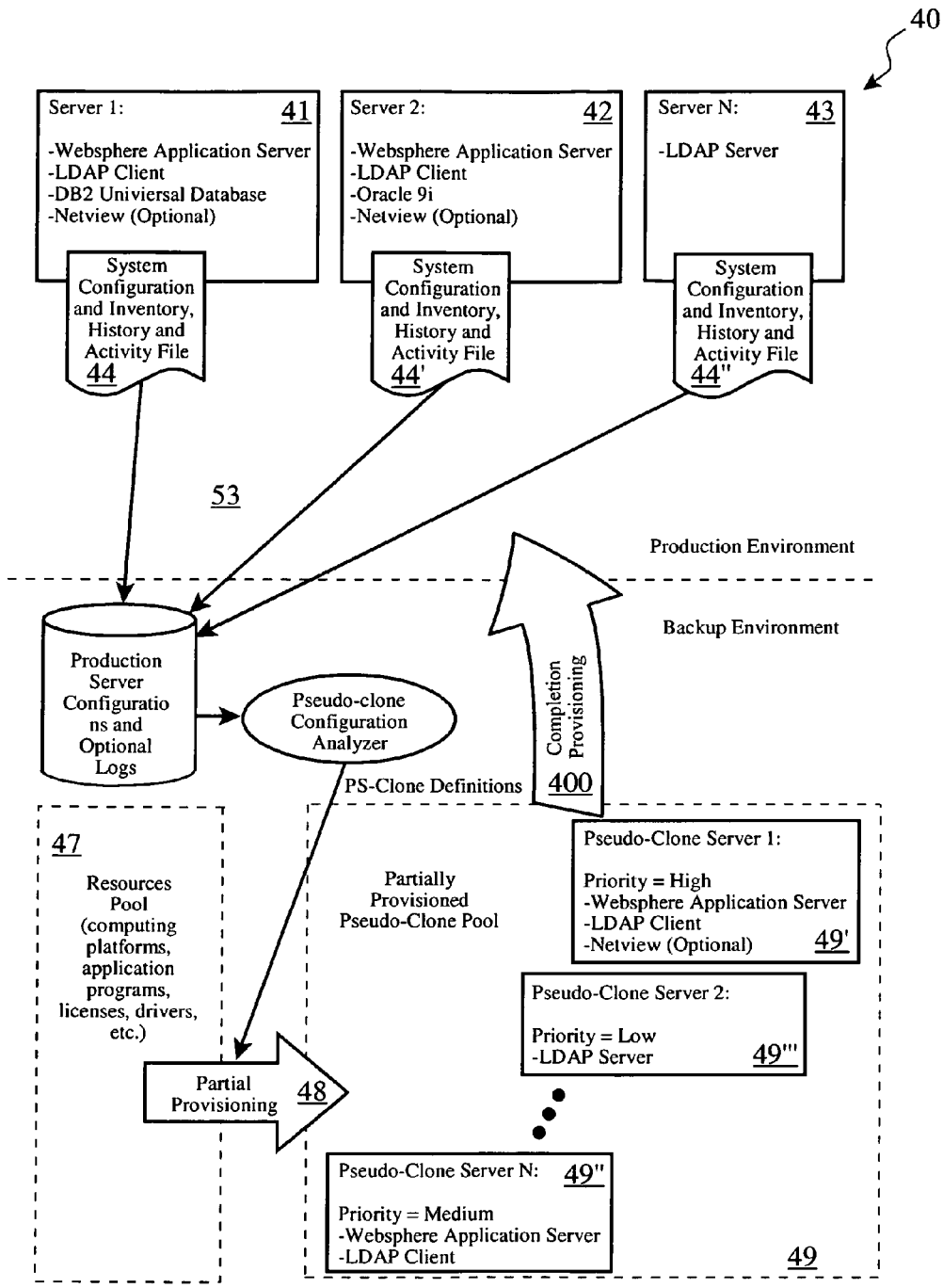
FIG. 4 illustrates components and activities of the pseudo-clone configuration and deployment processes according to the present invention.

The example of FIG. 4 is relatively simple, with just three different server configurations, and seven different component options. As such, it may be misleading to assume that the highest common denominator can be determined almost visually for such systems, while in practice, the number of configuration options or characteristics which must be considered in order to determine highest-common denominator pseudo-clone pre-configurations is much greater and more complex, including but not limited to the following options:

(1) hardware platform, including memory amount, disk size and speed, communications bandwidth and type, and any application-specific hardware (e.g. video processors, audio processors, etc.);

(2) operating system make and model (e.g IBM AIX™, Microsoft Windows XP Professional™, Unix, Linux, etc.), including any applicable revision level, update level, and service packs;

(3) application programs and suites, including but not limited to web servers, web resource handlers (e.g. streaming video servers, Macromedia FLASH servers, encryption servers, credit card processing clients, etc.), database programs, and any application specific programs (e.g. programs, Java Beans, servlets, etc.), including revision level of each; and (4) any middle-ware or drivers as required for each application.

For these reasons, the present invention can employ relatively simple logic for simple applications and enterprise configurations, or may employ ontological processes based on axiomatic set theory, such as processes employing Euclid's Algorithm, Extended Euclid's Algorithm, or a variant of a Ferguson-Forcade algorithm, is employed to find the highest or greatest common denominator which each server configuration is viewed as a set of components. It is within the skill of those in the art to employ other logical processes to find common sets and subsets of given sets, as well.

Use of Server Logs to Predict Configuration Requirements

According to an enhanced embodiment of the present invention, server logs (45) are collected (53) from the various servers for use in determining which components are likely to fail, and the expected time to failure. Hardware and even software components have failure rates, mean-time-between-failures, etc., which can be factored into the analysis to not only determine which pseudo-clone pre-configurations will support which subsets of production servers, but which production servers will likely fail earliest, so that more pseudo-clones for those higher failure rate production servers can be pre-configured and ready in time for the failure.

According to a further enhanced embodiment of the present invention, the expected time to failure and expected failure rates are applied to the pseudo-clone configurations to determine times in the future at which each pseudo-clone should actually be built and made ready.

As in the previous examples using FIG. 4, PS-CLONE(1+2+N) reliability predictions using of expected time to first failure $E_{FF}$ for each component can be calculated as:

$$E_{FF\text{-}PS(1+2+N)} = \text{Earliest of } (E_{FF\text{-}A} + E_{FF\text{-}B} + E_{FF\text{-}C} + E_{FF\text{-}D} + E_{FF\text{-}E} + E_{FF\text{-}G})$$

where $E_{FF\text{-}X}$ is the individual expected time to first failure for component X.

At the earliest expected time of failure $E_{FF\text{-}PS(1+2+N)}$ of any of the components of the PS-CLONE(1+2+N), the pseudo-clone system could be configured and made ready in the Pseudo-clone pool. Otherwise, until this time, the resources which would be consumed by the pseudo-clone can be used for other purposes.

Also note that unlike the determination of a highest common denominator for the pre-configuration of a pseudo-clone, the logical process of evaluation of the earliest time to first failure of a group of servers have different components must include all (e.g. the maximum superset) of the components that are in any of the targeted servers, not just the common components or the pseudo-clone components. This is because the pseudo-clone may be needed at a time which a component in a targeted server fails even when the component is a component which will be configured into the pseudo-clone in the completion steps (400).

Integration of Pseudo-Clone Logic to Provisioning Manager Systems

Using extensions to the provisioning management system, backup clients are integrated with each server using a failover workflow definition. This creates a failover pool with standby servers designated which creates an pseudo-clone for each server, where each pseudo-clone is suitable for a plurality of targeted production servers.

Failover workflow provisioning process are used when a failover event occurs which provides administrators with more management capability while decreasing manual steps required previously. The failed server is then decommissioned in the production pool and returned to a maintenance mode for further repair or recovery. IT administrators have the ability to configure backups frequently when necessary and monitor each solution by using the orchestration defined monitoring workflows. Therefore, backups from production servers are stored in backup (or pseudo-clone) server pools.

According to one aspect of one available embodiment of the invention, the ability to automate uninstallion or reinstallation of applications based on the role of each provisioned server is employed, with a combination in imaging technologies, disk partitioning, boot control, and automation logic that drives application and backup which enables the automation capability.

Logical Processes of the Invention

Turning to FIG. 5, a high-level representation of the logical process of the present invention with respect to establishing pseudo-clone systems is shown, including some of the optional or enhanced aspects as previously described.

Based on the data from server logs (53), an initial server activity and history is established (51) for each production server to be cloned. The invention optionally continues to monitor (53) for any server or requirement changes (52) based on server logs and new requirement information. If there are no changes (54), monitoring continues. If changes occur, or upon initial pseudo-clone pre-configuration, the invention reviews all information collected from sources such as the provisioning manager files (55) and other historical metric data (56).

A prediction is made (57) regarding each system component's factors such as need, priority level, and available resources. Next, the largest common denominator componentry is calculated (58), and appropriate pre-configuration and finish configuration workflows are determined (59).

These workflows for the pre-configuration and finish configuration (30) for the pseudo-clone(s) (500) are output to the provisioning management system (30) for scheduling of implementation of the pseudo-clone.

Optionally, the activity for the targeted servers is tracked (53) and statistics (56) are updated in order to improve predictions and expectations, and thus pseudo-clone availability, over time as real events occur.

Enhanced Embodiments and Applications of the Invention

There are a number of aspects of enhanced and optional embodiments of the present invention, including a number of business processes enabled by certain aspects of the present invention.

System Upgrade and Patch Installation. According to one aspect of an option in an available embodiment, the invention can be used during system upgrades or patch installation with a controlled failover. In such a scenario, an administrator would plan when a production server would be upgraded or patched, and would implement the pseudo-clone before that activity starts. Then, to cause a graceful transition of the targeted system out of service, the administrator could initiate a simulated failure of the targeted system, which would lead to the provisioning management system placing the pseudo-clone online in place of the targeted system.

Infected and Quarantined Systems. According to another aspect of the present invention, a system which is diagnosed as being infected with a virus or other malicious code can also be quarantined, which effectively appears to be a system failure to the provisioning management system and which would lead to the pseudo-clone system being finally configured and placed online.

Sub-Licensed Systems. According to yet another aspect of an enhanced embodiment of the invention, pseudo-clones may be created, including the workflows to realize those pseudo-clones, with particular attention to sub-licensing configuration requirements. In this embodiment, not only is the entire pseudo-clone server configured in a certain manner to match a highest common component denominator of a group of targeted servers, but the common denominator analysis (58) is performed at a sub-server level according to any sub-licensing limitations of any of the targeted servers. For example, if one of three targeted servers is sub-licensed to only allow a database application to run on 3 of 4 processors in one of the servers, but all other target servers require the database application running on all available processors, the highest common denominator of all the targeted servers would be a sub-license for 3 processors of the database application, and thus the pseudo-clone would be partially configured (48) to only include a 3-processor database license. If the pseudo-clone were later to be completion provisioned (400) to replace one of the fully-licensed servers, the license on the pseudo-clone would be upgraded accordingly as a set of the completion provisioning.

Super-Licensed Systems. In a variation of the sub-licensing aspect of the present invention, license restrictions may be considered when creating a pseudo-clone which targets one or more servers which are under a group-level license restriction. Instead of sub-licensing, this could be considered "super-licensing", wherein a group of servers are restricted as to how many copies of a component can be executing simultaneously. In such a situation, the pseudo-clone configuration workflow can optionally either omit super-licensed components from the pseudo-clone configuration, or mark the super-licensed components for special consideration for de-provisioning just prior to placing the finalized replacement server online during completion provisioning.

In the first optional process, the invention determines (58) if a component of a highest common denominator component set is subject to a super-license restriction on any of the targeted servers. If so, it is not included in the pseudo-clone workflow for creating (48) the pseudo-clone, and thus the super-licensed component is left for installation or configuration during completion provisioning (400) when the terms of the super-license can be verified just before placing the replacement server online.

In the second optional process, the same super-licensing analysis is performed (400) as in the first optional process, but the super-licensed component is configured (48) into the pseudo-clone (instead of being omitted). The super-licensed component, however, is marked as a super-licensed component for later consideration during completion provisioning. During completion provisioning (400), the workflow is defined to check the terms of the super-license and the real-time status of usage of the licensed component, and if the license terms have been met or exceeded by the remaining online servers, the completion workflow de-provisions the super-licensed component prior to placing the replacement server online.

High Availability Prediction. According to another aspect of an enhanced embodiment of the present invention, the failure predictor (57) is not only applied to the components of the targeted computing systems, but is also applied (501) to the components of the pseudo-clone itself. By analyzing the failure rates of the pseudo-clone itself as defined by the largest common denominator (58) configuration, a workflow for realizing the pseudo-clone and the completion provisioning can be defined (59) which produces (60) to a standby server which will not likely fail while it is being relied upon as a standby server (e.g. the standby server will have an expected time to failure equal to or greater than that of the servers which it protects).

Grouping of Servers by High Availability Characteristics. Certain platforms are suitable for "high availability" operation, such as operation 24 hours per day, 7 days per week, 365 days per year. For example, these platforms typically run operating systems such as IBM's z/OS which is specifically designed for long term operation without rebooting or restarting the operating system. Other, low-availability platforms may run other operating system which do not manage their resources as carefully, and do not perform long term maintenance activities automatically, and as such, they are either run for portions of days, weeks, or years between reboots or restarts.

According to another optional enhanced aspect of the present invention, the failure predictor (57) is configured to perform failure prediction analysis on each server in the group of targeted servers, and to characterize them by their availability level such that the largest common denominator for a pseudo-clone can be determined to meet the availability objective of the sub-groups of targeted servers. Many times, this would occur somewhat automatically with the invention, as availability level of servers is often linked to the operating system of a server, and operating systems are typically a "must have" component in a server which must be configured, even in a pseudo-clone. For example, consider a targeted group of five servers in which 3 servers are high-availability running IBM's z/OS, and 2 servers are medium-availability running another less reliable operating system. The highest common denominator would not include an operating system, and thus a non-operational pseudo-clone would be configured without an operating system, therefore requiring grouping of the 5 servers into two groups along operating system lines.

But, in other configurations of servers, such critical components may be in common, but other non-critical components may determine whether the platform would be high, medium, or low availability. In these situations, this enhanced embodiment of the invention would be useful.

Time-to-Recover Objective Support. One of the requirements specified in many service level agreements between a computing platform provider/operator and a customer is a time objective for recovery from failures (e.g. minimum down time or maximum time to repair, etc.). In such a business scenario, it is desirable to predict the time that will be required to finalize the configuration of a pseudo-clone and place it in service. According to another aspect of an optional embodiment of the invention, the logical process of the invention analyzes the workflows and time estimates for each step (e.g. installation steps, configuration steps, start up times, etc.), and determines if the pseudo-clone can be completion provisioned for each targeted server within specified time-to-implement or time-to-recover times (502, 503). If not, the administrator is notified (504) to that a highest common denominator (e.g. closest available pseudo-clone) cannot be built which can be finalized within the required amount of recovery time. In response, the administrator may either negotiate a change in requirements with the customer, or redefine the groups of targeted servers to have a higher degree of commonality in each group, thereby minimizing completion provisioning time.

Time estimates for each provisioning step may be used, or actual measured time values for each step as collected during prior actual system configuration activities may be employed in this analysis. Alternatively, "firedrills" practices may be performed to collect actual configuration times during which a pseudo-clone is configured in advance, a failure of a targeted system is simulated, and a replacement system is completion provisioned from the pseudo-clone as if it were going to be placed in service. During the firedrill, each configuration step can be measured for how long is required to complete the step, and then these times can be used in subsequent analysis of expected time-to-recover characteristics of each pseudo-clone and each completion workflow.

General Computing Platform

The invention is preferably realized as a feature or addition to the software already found present on well-known computing platforms such as personal computers, web servers, and web browsers, and especially such as those provisioning management and on-demand computing systems already discussed.

These common computing platforms can include personal computers and enterprise-class servers, as well potentially as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 1:
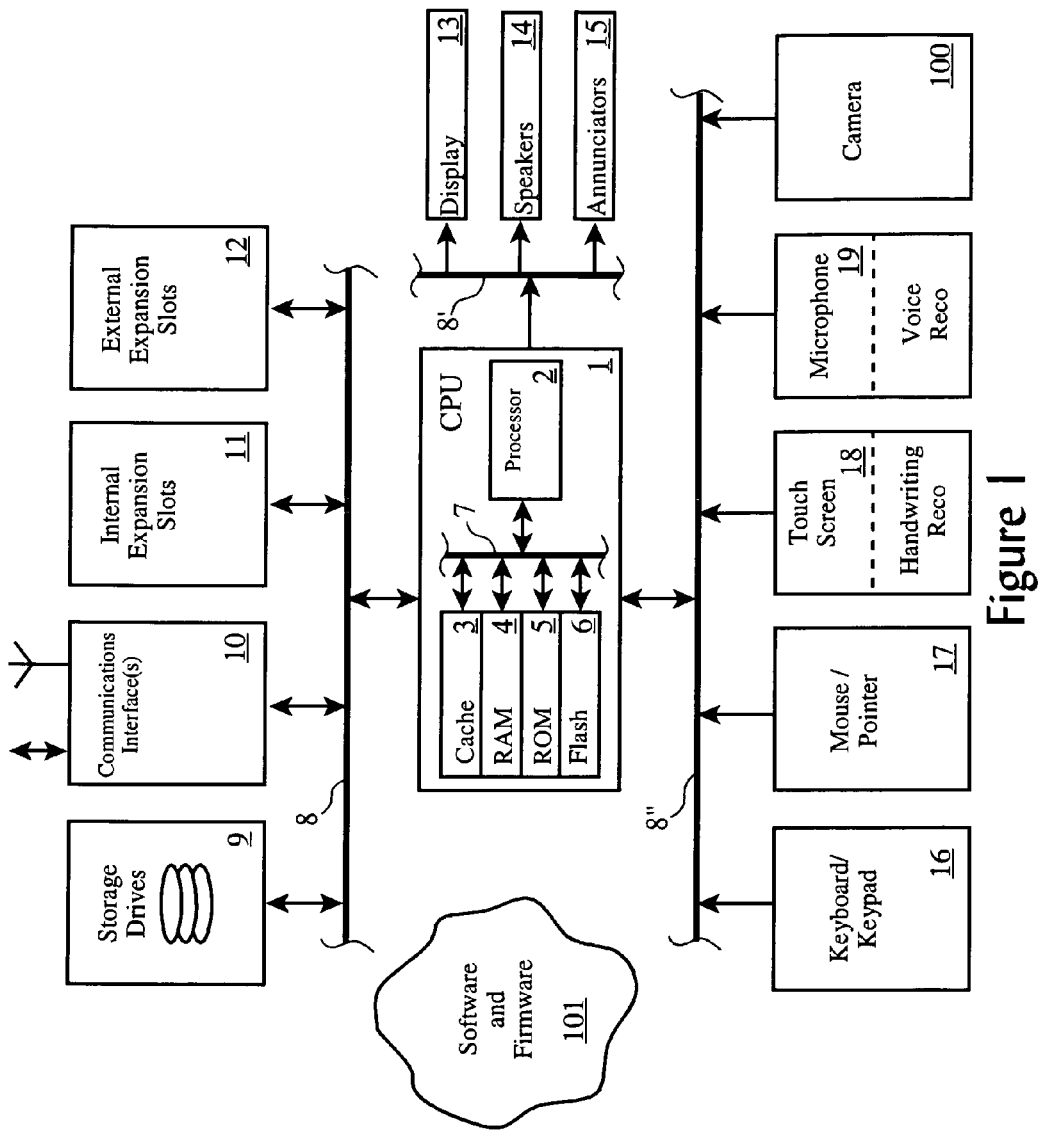
FIG. 1 depicts a generalized computing platform architecture, suitable for realization of the invention.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc. The computing platform is also provided with one or more software and firmware (101) programs to implement the desired functionality of the computing platforms.

Figure 2:
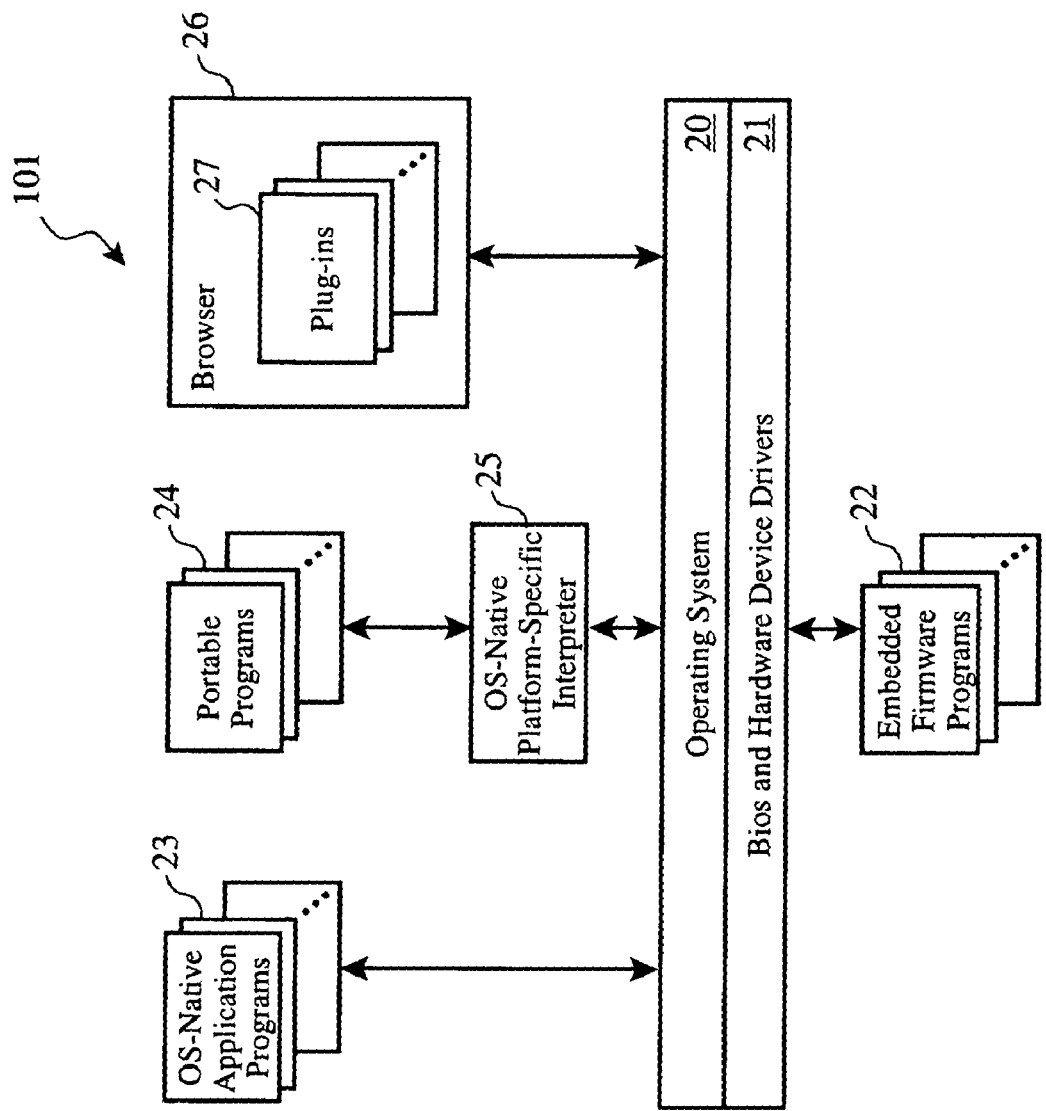
FIG. 2 shows a generalized organization of software and firmware associated with the generalized architecture of FIG. 1.
Figure 3:
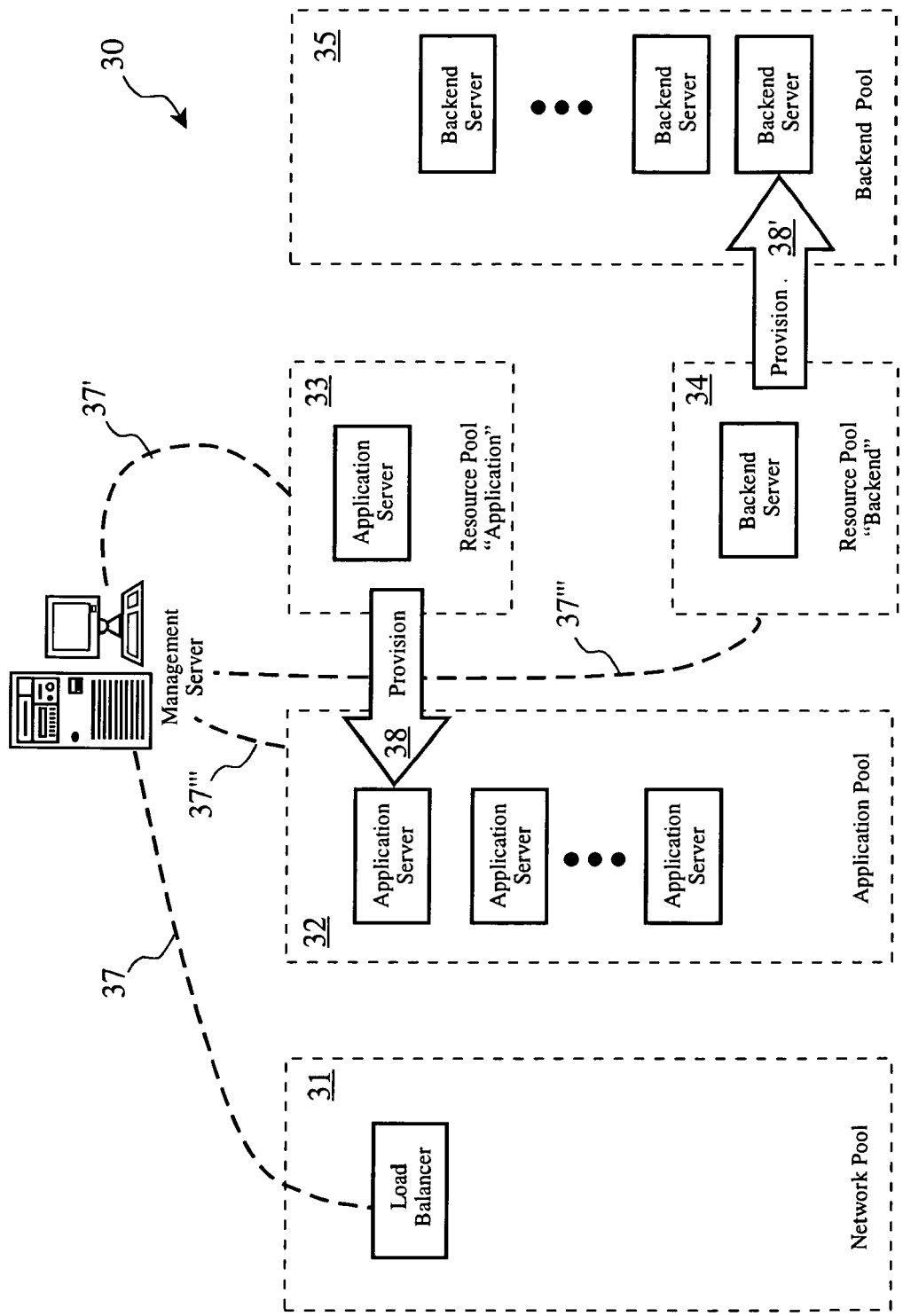
FIG. 3 illustrates components and activities of typical provisioning management systems.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or micro-browser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms. It will be readily recognized by those skilled in the art that the following methods and processes may be alternatively realized as hardware functions, in part or in whole, without departing from the spirit and scope of the invention.

CONCLUSION

Several example embodiments and optional aspects of embodiments have been described and illustrated in order to promote the understanding of the present invention. It will be recognized by those skilled in the art that these examples do not represent the scope or extent of the present invention, and that certain alternate embodiment details may be made without departing from the spirit of the invention. For example, in some embodiments, an image server may be employed for some or all of the workflow execution for realizing a pseudo-clone or completion provisioning of a replacement server. Therefore, the scope of the present invention should be determined by the following claims.

What is claimed is:

1. A computer-implemented method comprising:
evaluating a plurality of configurations for a plurality of targeted computing systems, each of the configurations being a list of installed hardware components and installed software components for a specific targeted computing system, the plurality of configurations having at least two different configurations;
responsive to the evaluating, determining a subset of components in common among the different configurations, the subset being less than but not all of the installed hardware components and installed software components of any of the targeted computing system;
determining an initial pseudo-clone configuration including the subset of components and excluding components which are not in common among the different target hardware configurations;
for each of the plurality of targeted computing systems, producing a finish-out workflow of installation steps and components to be installed into an incompletely configured computer system according to the pseudo-clone configuration to produce an operational clone system; and
outputting the pseudo-clone configuration and the finish-out workflow to a provisioning management system for subsequent realization of a pseudo-clone backup computing system and further subsequent realization of one or more operational clone systems.

2. The method as set forth in claim 1 further comprising realizing a pseudo-clone backup computing system by configuring a computing system according to the pseudo-clone configuration.

3. The method as set forth in claim 2 further comprising:
realizing a replacement computing system by further configuring the pseudo-clone backup computing system according to the workflow difference; and
transferring computing tasks from the targeted computing system to the replacement computing system thereby relieving the targeted computing system of its computing tasks.

4. The method as set forth in claim 3 wherein realizing a replacement computing system and transferring computing tasks are performed responsive to an event selected from a group comprising a failure of the targeted computing system, a planned disablement of the targeted computing system, and a quarantine action against the targeted computing system.

5. The method as set forth in claim 2 further comprising:
prior to performing the realizing a pseudo-clone backup computing system, performing a failure prediction analysis upon the targeted computing systems to determine an expected time to first failure; and
delaying the realization of the pseudo-clone backup until a time proximate to the time to first failure from the earliest of a targeted computing system being placed in service.

6. The method as set forth in claim 5 further comprising:
monitoring actual failure rates of the targeted computing system;
maintaining a historical record of the failures; and modifying the failure analysis to compensate the expected time to first failures to approximate the actual failure rates such that the delaying represents historical failure characteristics of the installed hardware components and the installed software components.

7. The method as set forth in claim 5 wherein performing a failure prediction analysis comprises grouping the targeted servers into sub-groups according to high-availability, low down-time characteristics of the targeted servers, and comprises performing a failure prediction analysis on each group of similarly-characterized targeted servers.

8. The method as set forth in claim 2 further comprising:
prior to determining a pseudo-clone configuration, performing a failure analysis upon the pseudo-clone configuration to determine an expected time to first failure of a potential pseudo-clone system; and
revising the pseudo-clone configuration if the expected time to first failure is less than an objective operation duration of a pseudo-clone as a standby server.

9. The method as set forth in claim 1 further comprising:
determining one or more subsets of targeted computing systems having a number of installed hardware components and installed software components in common greater than a number of components in common among all of the targeted computing systems;
producing one or more higher-priority pseudo-clone configuration definitions including the common installed components of the subset of targeted computing systems; and
outputting the higher-priority pseudo-clone configuration definitions to a provisioning management system for subsequent realization of one or more pseudo-clone backup computing systems.

10. The method as set forth in claim 1 further comprising evaluating sub-licensing conditions for the installed software components, wherein producing a pseudo-clone configuration definition comprises omitting non-licensed components which are not shared commonly across all the targeted computing systems, and wherein determining a finish-out workflow comprises determining if any sub-licensed components in the pseudo-clone are to be upgraded to a greater sub-license or a full license to produce an operational clone system.

11. The method as set forth in claim 1 wherein the evaluating of the plurality of configurations comprises determining that one or more super-licensing conditions exist among the plurality of configurations, wherein producing a pseudo-clone configuration comprises omitting the components which are determined to be super-licensed on any targeted computing system, and wherein producing a workflow comprises determining if any super-licensed components in the targeted computing systems are to be realized in the replacement computing system according to a super-license constraint.

12. The method as set forth in claim 1 wherein the evaluating of the plurality of configurations comprises determining that one or more super-licensing conditions exist among the plurality of configurations, wherein producing a pseudo-clone configuration comprises including and denoting the components which are determined to be super-licensed on any targeted computing system, and wherein determining a difference configuration comprises determining if any super-licensed components in the pseudo-clone system are to be de-provisioned according to a super-license constraint.

13. The method as set forth in claim 3 further comprising:
prior to the realizing a replacement computing system, performing an analysis of steps required for the finish-out workflow to determine the expected time to implement a replacement computing system according to the workflow;
comparing the expected time to realize a replacement computing system to an objective time-to-implement value; and
responsive to the expected time exceeding the objective time-to-implement, notifying an administrator of the exceed objective.

14. The method as set forth in claim 13 wherein the analysis of steps required for the finish-out workflow difference configuration comprises employing workflow step times measured during one or more prior actual system configuration and provisioning.

15. The method as set forth in claim 14 wherein the workflow step times are collected during one or more practice recovery operations in which actual a pseudo-clone is realized, a failure is simulated, and the pseudo-clone is reconfigured according to the difference configuration.

* * * * *